(12) United States Patent  
Yeung et al.

(10) Patent No.: US 8,400,183 B1
(45) Date of Patent: Mar. 19, 2013

(54) VOLTAGE CONVERSION (75) Inventors: Tony Yeung, Milpitas, CA (US); Michael Yimin Zhang, Palo Alto, CA (US)

(73) Assignee: Pericom Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/008,328

(22) Filed: Jan. 18, 2011

Related U.S. Application Data (63) Continuation-in-part of application No. 12/400,708, filed on Mar. 9, 2009, now Pat. No. 7,915,923.

(51) Int. Cl.
*H03K 19/0175* (2006.01)

(52) U.S. Cl. .............................. 326/63; 326/83; 327/333

(58) Field of Classification Search .................... 326/63, 326/68, 80–83; 327/333
See application file for complete search history.

(56) References Cited

U.S. PATENT DOCUMENTS

| 7,002,870 B2 * | 2/2006 | Hsu ................................ 365/227 |
| 2008/0037306 A1 * | 2/2008 | Marhefka et al. ............. 363/149 |

* cited by examiner

*Primary Examiner* — Vibol Tan
(74) *Attorney, Agent, or Firm* — The Webostad Firm (57) ABSTRACT

An embodiment of a method for powering a low-power device using a power supply designed for a high-power device is described. In such an embodiment, an input voltage is provided to a voltage converter at a first voltage level. The input voltage is periodically electrically coupled to and decoupled from the voltage converter during operation of the low-power device. An output voltage is output from the voltage converter at a second voltage level to power the low-power device. The output voltage is provided during both the input voltage being electrically coupled to and decoupled from the voltage converter, and the second voltage level is substantially less than the first voltage level.

23 Claims, 5 Drawing Sheets

VOLTAGE CONVERSION

CROSS-REFERENCE TO RELATED APPLICATIONS

This application is a continuation-in-part of commonly-assigned U.S. patent application Ser. No. 12/400,708, filed Mar. 9, 2009, which is incorporated herein by reference in its entirety for all purposes.

FIELD

One or more aspects of the invention generally relate to voltage conversion. More particularly, an embodiment of the invention relates to a DC-to-DC voltage converter.

BACKGROUND

High-speed serial data driven between a transmitter and a receiver may be conditioned by an intermediary signal conditioning device. Pericom Semiconductor Corporation ("Pericom") of San Jose, Calif., provides such intermediary signal condition devices under the name of ReDriver™ devices. Conventionally, intermediary signal conditioning devices are formed using bipolar junction transistors ("BJTs"). However, ReDriver™ devices from Pericom use metal-oxide-semiconductor ("MOS") transistors. Conventional BJT-based intermediary signal condition devices use higher levels of voltage supply for performing at high performance levels, such as for high-speed serial data communication for example, than comparably positioned ReDriver™ devices from Pericom.

However, conventional communication power supplies used in high-speed serial data application are tailored to providing voltage supply levels for BJT-based devices and not MOS-based devices. These power supplies heretofore precluded use of MOS-based devices in such communication applications.

Accordingly, it would desirable and useful to provide for use of MOS-based devices in communication applications conventionally associated with BJT-based devices.

BRIEF SUMMARY

One or more aspects generally relate to voltage conversion.

An embodiment relates generally to a method for powering a low-power device using a power supply designed for a high-power device is described. In such an embodiment, an input voltage is provided to a voltage converter at a first voltage level. The input voltage is periodically electrically coupled to and decoupled from the voltage converter during operation of the low-power device. An output voltage is output from the voltage converter at a second voltage level to power the low-power device. The output voltage is provided during both the input voltage being electrically coupled to and decoupled from the voltage converter, and the second voltage level is substantially less than the first voltage level.

Another embodiment relates generally to a voltage converter. In such embodiment, a voltage input port is for receiving an input voltage. A bimodal switch is coupled to the voltage input port. A voltage output port is coupled to the bimodal switch for sourcing an output voltage. A ground port is coupled to the bimodal switch. A phase signal generator is coupled to the voltage output port for feedback of the output voltage and configured to generate a first phase signal and a second phase signal. The first phase signal and the second phase signal are at least approximately 180 degrees out-of-phase with respect to one another. The bimodal switch is coupled to receive the first phase signal and the second phase signal. The bimodal switch is configured to electrically couple and decouple the bimodal switch to and from the input voltage port responsive to the first phase signal and the second phase signal.

BRIEF DESCRIPTION OF THE DRAWING(S)

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION

In the following description, numerous specific details are set forth to provide a more thorough description of the specific embodiments. It should be apparent, however, to one skilled in the art, that the invention may be practiced without all the specific details given below. In other instances, well-known features have not been described in detail so as not to obscure the embodiments. For ease of illustration, the same number labels are used in different diagrams to refer to the same items; however, in alternative embodiments the items may be different. Furthermore, though particular numerical examples may be described herein for purposes of clarity by way of example, it should be understood that the scope of the description is not limited to these particular numerical examples as other values may be used.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

A low power intermediary signal conditioning device powered by a DC-to-DC voltage converter is described. The combination of such an intermediary signal conditioning device with a DC-to-DC voltage converter provides a serial interface, where such serial interfaced may be provided in a single chip, namely a monolithic integrated circuit ("IC"), or as two separate dies of a multi-chip module ("MCM"). For example, such a DC-to-DC voltage converter may be formed on a same semiconductor die, namely monolithic integration, with an intermediary signal conditioning device, such as a ReDriver™ device available from Pericom. In another embodiment, such a DC-to-DC voltage converter and an intermediary signal conditioning device, such as a ReDriver™ device available from Pericom, may be integrated within a same MCM.

As described below in additional detail, a DC-to-DC voltage converter, which is a voltage step-down regulator, may provide a low voltage supply to an intermediary signal conditioning device for high-speed data communication, such as high-speed differential signaling for transmission of serial data. By high-speed, it generally should be understood to be data rates at least compliant with a Peripheral Component Interconnect Express ("PCIe") specification. Moreover, such data rates may be in excess of 5 Gigabits per second ("Gbps'), such as for example for Serial Advanced Technology Attachment ("SATA") 3.0, Serial Attached SCSI ("SAS") 2.0, or other high-speed data interface specification.

As described hereinbelow in additional detail, provided is a DC-to-DC voltage converter that does not have to use, internally or externally, any inductor. Rather, a switched-capacitor architecture is used in order to obtain a power efficient voltage converter. Such switched-capacitor architecture may use external capacitors, which tend to be significantly large, in order to provide a relatively small die size for such a DC-to-DC voltage converter. In an embodiment, such discrete capacitors may be external to an MCM having such DC-to-DC voltage converter and an intermediary signal conditioning device. However, in another embodiment, such capacitors may be internal to an MCM having such DC-to-DC voltage converter and an intermediary signal conditioning device As will be appreciated from the following description, a DC-to-DC voltage converter may use a pulse width modulation ("PWM") feedback control, where pulse width may be varied according to load. Furthermore, such pulse width may be varied while maintaining a fixed switching frequency to limit noise, or more particularly noise spectrum, within a frequency band of operation of such DC-to-DC voltage converter. Thus, it should be appreciated that such a DC-to-DC voltage converter may be more efficient than a conventional linear regulator of equivalent performance and easier to control that a conventional inductor-based switched-mode regulator of equivalent cost.

Figure 1:
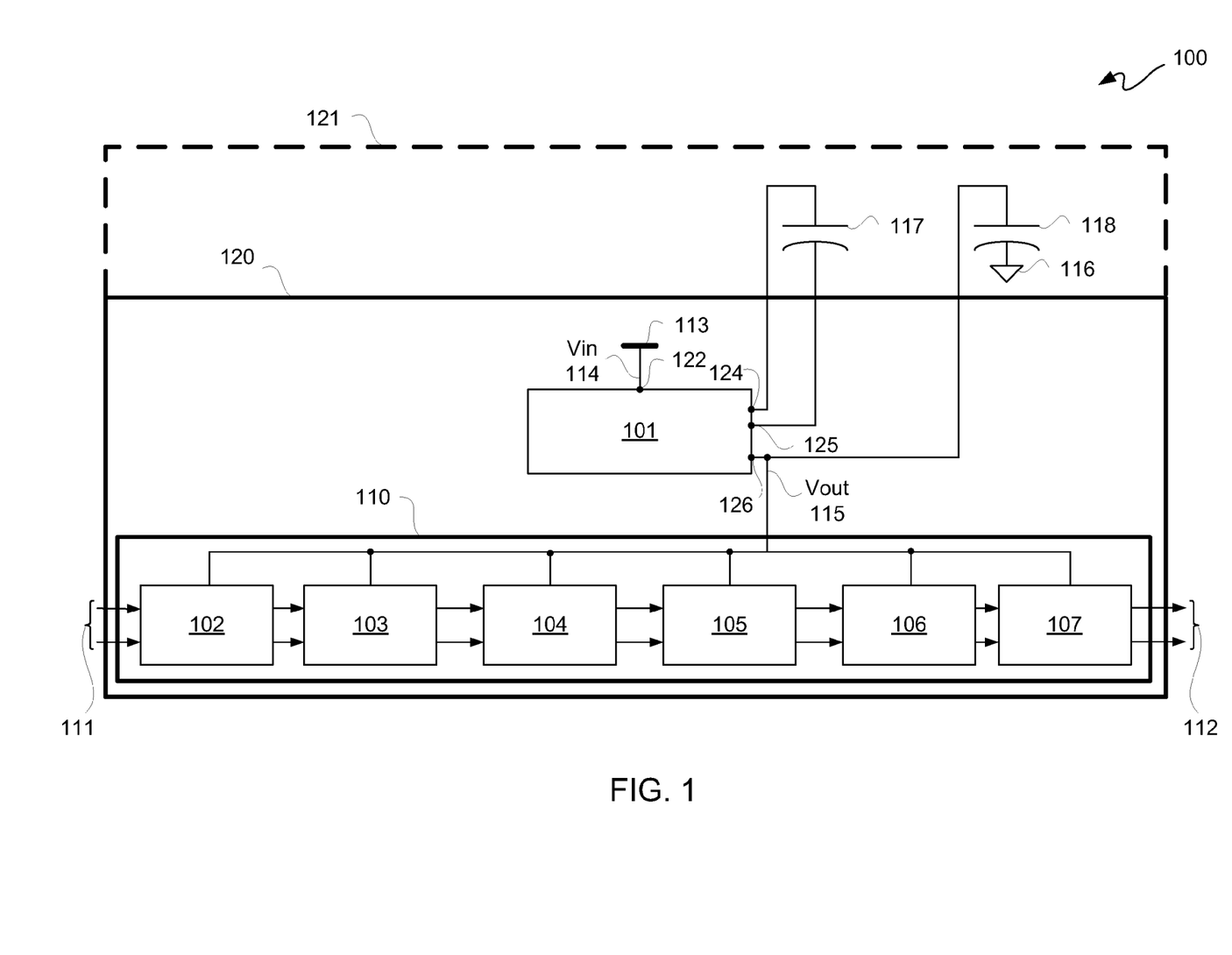
FIG. 1 is a block diagram depicting an exemplary embodiment of an intermediary signal conditioning system.

FIG. 1 is a block diagram depicting an exemplary embodiment of an intermediary signal conditioning system 100. Intermediary signal conditioning system 100 includes intermediary signal conditioning device 110 and DC-to-DC voltage converter 101, and may further include capacitors 117 and 118.

Intermediary signal conditioning device 110 receives input information from a transmitting device and provides output information to a receiving device. Intermediary signal conditioning system 100 may be formed on a single monolithic IC or an MCM 120. For reasons of die size for an IC embodiment, capacitors 117 and 118 are external to an IC 120. For an MCM embodiment, capacitors 117 and 118 may be internal or external to such MCM, as generally indicated by dashed line 121. However, for purposes of clarity by way of example and not limitation, it shall be assumed that both capacitors 117 and 118 are external to an IC or MCM 120, even though in an MCM embodiment either or both of capacitors 117 and 118 may be internal to an MCM.

Furthermore, for purposes of clarity by way of example and not limitation, it shall be assumed that intermediary signal conditioning device 110 and DC-to-DC voltage converter 101 are formed of separate dies as part of an MCM 120. However, it should be understood that a single die may be used in which both DC-to-DC voltage converter 101 and intermediary signal conditioning device 110 are co-located.

Intermediary signal conditioning device 110 includes input termination 102, equalizer 103, limiter 104, driver/re-driver 105, output stage 106, and output termination 107. Additional details regarding an embodiment of intermediary signal conditioning device 110 may be found in a co-pending patent application entitled "Serial Link Driver Interface for a Communication System", by Tony Yeung, et al., filed Mar. 9, 2009, assigned application Ser. No. 12/400,708, which is incorporated by reference herein in its entirety for all purposes.

In the exemplary embodiment, differential serial information, such as differential serial data 111, is input to input termination 102. Even though an example of intermediary signal conditioning device 110 is provided, and another embodiment of intermediary signal conditioning device 110 is described in the above-referenced co-pending patent application, it should be understood that MCM 120 is not limited to the particular implementation of a differential intermediary signal conditioning device 110 illustratively depicted or incorporated by reference. Rather, any intermediary signal conditioning device using power voltage supply levels generally associated with MOS-based devices may be used.

After differential serial data 111 is processed through blocks 102 through 107, output from output termination 107 is provided as differential information, such as differential serial data 112. Each of blocks 102 through 107 has power supplied by an output voltage ("Vout") 115, where output voltage 115 is sourced from an output node 126 of DC-to-DC voltage converter 101.

As previously described, DC-to-DC voltage converter 101 is "inductorless." In other words, no internal or external inductors need be used for operation of DC-to-DC voltage converter 101 as described herein.

DC-to-DC voltage converter 101 is coupled to a supply voltage source 113. From supply voltage source 113, which for example may be at a BJT Vdd level or other relatively high supply voltage level with respect to output voltage level of output voltage 115, an input voltage ("Vin") 114 is obtained at an input voltage node 122 of DC-to-DC voltage converter 101. A capacitor 117 is coupled between an interim common node 124 and an interim common node 125 of DC-to-DC voltage converter 101. A capacitor 118 is coupled between output voltage node 126 of DC-to-DC voltage converter 101 and ground 116.

DC-to-DC voltage converter 101 is configured to convert input voltage 114, which is a relatively high external supply voltage, to provide a stable and regulated internal supply, with respect to an IC or MCM embodiment, for high-speed circuitry associated with intermediary signal conditioning device 110. For purposes of clarity by way of example and not limitation, it shall be assumed that supply voltage source 113 is for a conventional BJT-based intermediary signal conditioning device. However, as shall be appreciated from the following description, DC-to-DC voltage converter 101 is a MOS-based device. Furthermore, it should be understood that intermediary signal conditioning device 110 is also a MOS-base device, and thus output voltage 115 is substantially stepped down from input voltage 114 by DC-to-DC voltage converter 101.

Thus, it should be understood that intermediary signal conditioning system 100 may be used in interim communication applications conventionally designed for BJT-based devices. Additionally, it should be understood that MOS devices, in contrast to BJT devices, conventionally consume less power.

Figure 2:
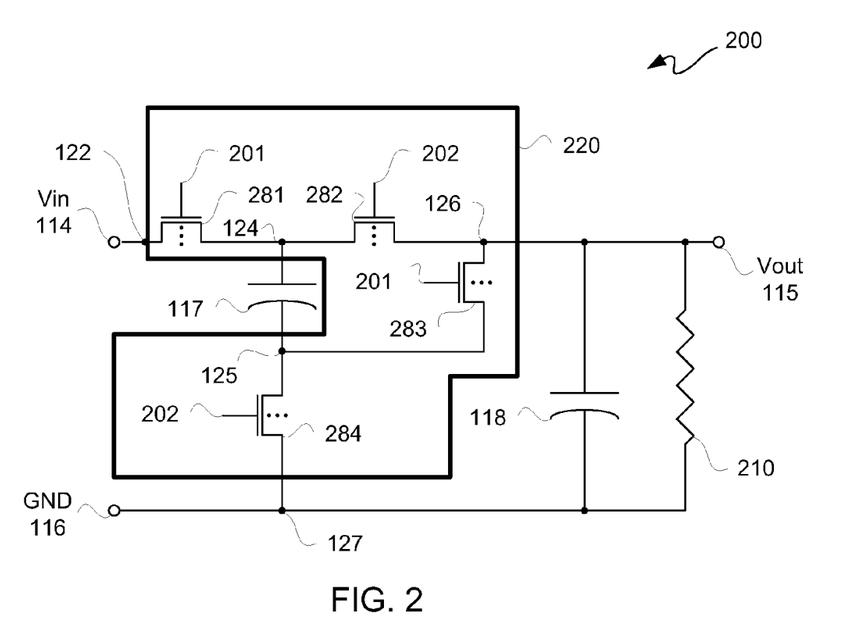
FIG. 2 is a circuit diagram depicting an exemplary embodiment of a voltage converter model.

FIG. 2 is a circuit diagram depicting an exemplary embodiment of a voltage conversion model 200. For purposes of this model 200, any and all loads associated with an intermediary signal conditioning device, such as intermediary signal conditioning device 110, are modeled as a fixed resistor 210. Blocked-off portion 220 is used to indicate a portion of DC-to-DC voltage converter 101, namely a bimodal switch 220 of DC-to-DC voltage converter 101. Bimodal switch 220 includes transistors 281 through 284, as described below in additional detail.

At input port or node 122, input voltage 114 is provided to bimodal switch 220. At ground node 127, ground 116 is coupled to bimodal switch 220 as well as to capacitor 118 and resistor 210. At voltage output node 126 of bimodal switch 220, capacitor 118 and resistor 210 are coupled, and output voltage 115 is sourced from output voltage node 126. Thus, capacitor 118 and resistor 210 are coupled in parallel.

Input voltage 114 is provided to a source/drain node of transistor 281. For purposes of clarity by way of example and not limitation, transistors 281, 282, 283, and 284 are illustratively depicted as NMOS transistors. However, it should be appreciated that PMOS or a combination of NMOS and PMOS transistors may be used. Furthermore, it should be understood that multiple transistors in parallel or multiple transistors in series or a combination of multiple transistors in parallel and in series, whether all of the same or different MOS types may be used with respect to transistors 281 through 284. However, for purposes of clarity by way of example and not limitation, it shall be assumed that transistors 281 through 284 are single transistors, even though multiple transistors in parallel for example may be used as generally indicated in FIG. 2.

A gate of transistor 281 is coupled to receive phase signal 201. Another source/drain node of transistor 281 is coupled to interim common node 124. Interim common node 124 is common with a top node of capacitor 117 and a source/drain node of transistor 282. Another source/drain node of transistor 282 is coupled to voltage output node 126. A gate of transistor 282 is coupled to receive phase signal 202.

Capacitor 117 is coupled between interim common nodes 124 and 125 of bimodal switch 220. Interim common node 125 is common with respective source/drain nodes of transistors 283 and 284 and a bottom node of capacitor 117. Another source/drain node of transistor 283 is coupled to voltage output node 126, and transistor 283 is gated with phase signal 201. Another source/drain node of transistor 284 is coupled to a ground node or port 127. Transistor 284 is gated with phase signal 202.

As described below in additional detail, phase signals 201 and 202 are at least approximately 180 degrees out of phase with respect to one another. Even though a bi-phase embodiment is illustratively described, it should be understood that other phase relationships may be used, such as a tri-phase or quadrature phase relationship for example. However, for purposes of clarity by way of example and not limitation, a bi-phase relationship is described, where one phase may be generally associated with charging and another phase may be generally associated with discharging, as described below in additional detail.

Figure 3:
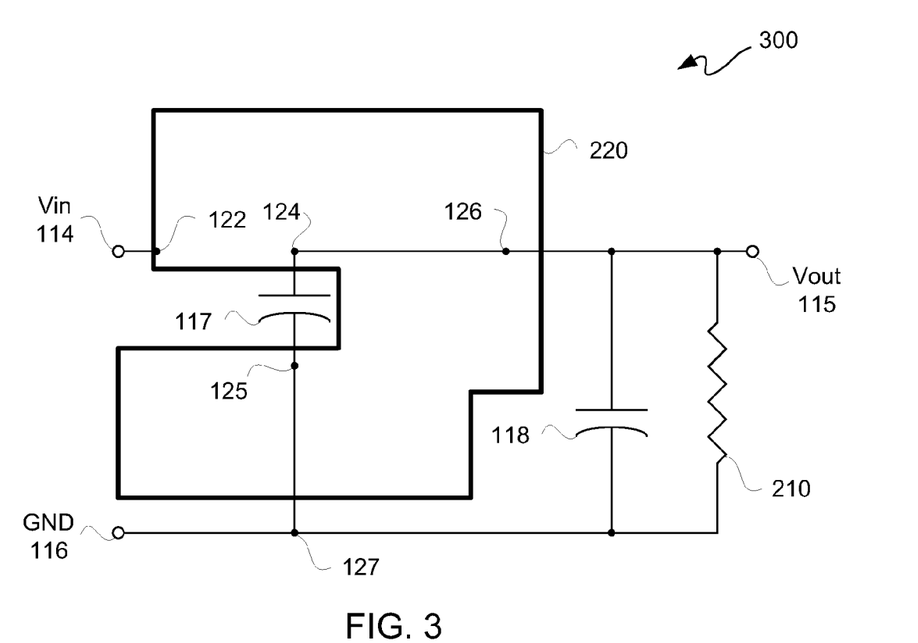
FIGS. 3 and 4 are circuit diagrams depicting the voltage converter of FIG. 2 in exemplary embodiments of two different states, namely a discharging state and a charging state, respectively.
Figure 4:
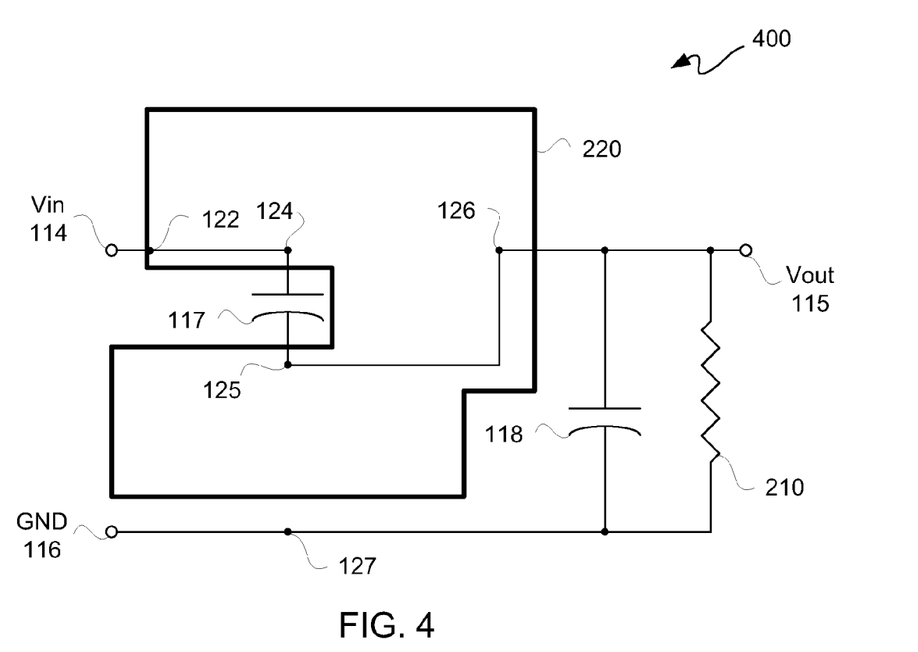

FIGS. 3 and 4 are the circuit diagrams of FIG. 2 in two different states, namely a discharging state 300 and a charging state 400, respectively. Discharging state 300 and charging state 400 are further described with ongoing reference to FIGS. 1 through 4.

It should be understood that bimodal switch 220 is coupled to receive phase signals 201 and 202, and for phase signal 201 being asserted, transistors 281 and 283 may be modeled as shorts or short circuits. It should further be understood that for phase signal 201 being asserted, phase signal 202 is not asserted, and thus transistors 282 and 284 may be modeled as opens or open circuits. Likewise, for phase signal 201 not being asserted, transistors 281 and 283 may be modeled as opens, and for phase signal 202 being asserted, transistors 282 and 284 may be modeled as shorts. Accordingly, it should be understood that for this embodiment of an NMOS based bimodal switch, assertion of a phase signal is associated with a logic high or 1 state, and de-assertion or non-assertion of a phase signal is associated with a logic low or 0 state. Furthermore, as modeled in FIGS. 3 and 4, combinations of transistors may more generally be thought of as switches.

For discharging state 300, capacitor 117 discharges charge to voltage output node 126, and capacitor 118 effectively discharges charge to node 126 though in a regulated manner. It should be understood that in discharging state 300, capacitors 117 and 118 are coupled in parallel and thus the effective capacitance is the sum of the individual capacitances. Again, resistor 210 represents an equivalent impedance of a load of intermediary signal conditioning device 110. Capacitors 117 and 118 and resistor 210 are all in parallel with one another, and thus output voltage 115 may be held at a stable voltage level for a period time.

Generally, capacitor 117 may be larger than capacitor 118. In other words, effectively capacitor 117 is a relatively large "bucket of charge" which discharges or "spills over" into a "smaller bucket of charge" associated with capacitor 118, in order to ensure that output voltage 115 is stable for a defined period of time, which may vary from application-to-application.

In charging state 400, phase signal 201 is de-asserted or not asserted, and thus transistors 281 and 283 may be modeled as open circuits. Furthermore, in charging state 400, phase signal 202 is asserted, and thus transistors 282 and 284 may be modeled as shorts. It should be understood that the modeling of transistors described with reference to FIGS. 3 and 4 ignores any capacitances or resistances of such transistors for purposes of clarity by way of example and not limitation. However, it should be understood that the capacitances and resistances of such transistors may be negligible.

In charging state 400, input voltage 114 is provided to capacitor 117 for charging capacitor 117, and such input voltage 114 is provided to capacitor 118 via capacitor 117, namely capacitively coupled, for charging capacitor 118. In charging state 400, input voltage 114 is used to provide output voltage 115, where output voltage 115 is effectively regulated by capacitor 118 being in parallel with resistor 210. Thus, in charging state 400, effective capacitance of capacitors 117 and 118 is that of a capacitor divider.

In charging state 400, it should be understood that input voltage 114 is substantially larger than output voltage 115. For purposes of clarity by way of example and not limitation, it should be appreciated that voltage level of input voltage 114 may be approximately $\approx$ 2 to $\approx$ 3 times larger than voltage level of output voltage 115. More particularly, because voltage level of input voltage 114 may be for a conventional BJT-based device having a voltage range of approximately $\approx$ 3.3 to $\approx$ 5.0 volts, voltage level of output voltage 115 may be in a range of approximately $\approx$ 1.2 to $\approx$ 1.5 volts for powering a MOS-based device.

Again, it should be understood that a MOS-based device consumes significantly less power than a bipolar device at comparable levels of performance, as described herein. Additionally, it should be understood that DC-to-DC voltage converter 101 consumes less power when electrically decoupled from input voltage 114, such as in discharging state 300, than when electrically coupled to input voltage 114, such as in charging state 400. Thus, output voltage 115 may be continuously provided without continuously drawing current associated with current draw from supply voltage source 113 of FIG. 1 as associated with input voltage 114.

Accordingly, by discontinuously drawing current while continuously providing sufficient output voltage 115 for operating a lower power device, such as intermediary signal conditioning device 110, overall power consumption of DC-to-DC voltage converter 101 is reduced. Again, it should be appreciated that DC-to-DC voltage converter 101 does not need any internal or external inductor for operation.

As described herein, it should be appreciated that a higher input voltage 114 may be stepped down to provide a lower output voltage 115; however, such a discharging state has a finite period of duration for maintaining output voltage 115 at a sufficient level that is sufficiently stable. Thus, there is a frequency for shifting between charging state 400 and discharging state 300. More particularly, there is a frequency with respect to alternately asserting one of phase signals 201 and 202 over another of phase signals 201 and 202.

Figure 5:
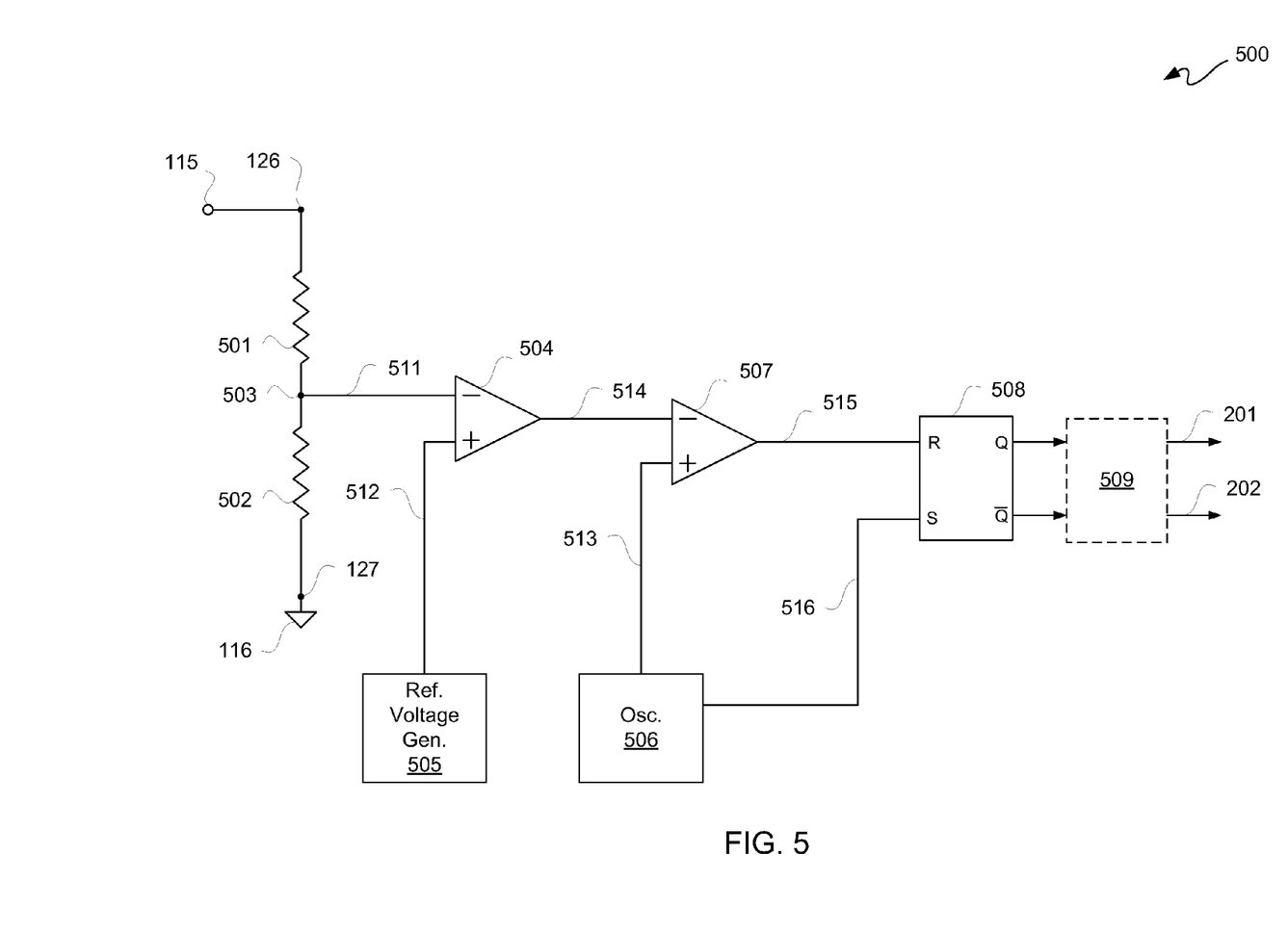
FIG. 5 is a block/circuit diagram depicting an exemplary embodiment of a phase signal generator.

FIG. 5 is a block/circuit diagram depicting an exemplary embodiment of a phase signal generator 500. Phase signal generator 500 is part of DC-to-DC voltage converter 101 of FIG. 1. More particularly, phase signals 201 and 202 output from phase signal generator 500 are provided as gating signals to gates of transistors of bimodal switch 220 of FIG. 2, as previously described. Additionally, output voltage 115 is provided as a feedback voltage for operation of phase signal generator 500.

In this exemplary embodiment, phase signal generator 500 includes resistors 501 and 502, amplifier 504, comparator 507, flip-flop 508, and optionally, output buffer 509. Additionally, phase signal generator may include reference voltage generator 505 and/or oscillator 506. Optionally, reference voltage generator 505 and/or oscillator 506 may be external to DC-to-DC voltage converter 101 of FIG. 1.

Resistor 501 may be coupled between output voltage node 126 and voltage divider node 503. Resistor 502 may be coupled between voltage divider node 503 and ground node 127. Accordingly, a divided voltage, namely effective voltage 511, may be sourced from node 503. A minus input port of amplifier 504 may be coupled to voltage divider node 503 to receive effective voltage 511 therefrom. Furthermore, a plus port of amplifier 504 may be coupled to receive a reference voltage 512 output from reference voltage generator 505.

Amplifier 504 may be an analog amplifier configured to provide an analog voltage 514 as an output. In this exemplary embodiment, analog voltage 514 is reference voltage 512 minus effective voltage 511, with the result of such subtraction multiplied by the gain of amplifier 504. In other words, a voltage divider formed by resistors 501 and 502 may be used to provide a divided voltage, and where such divided voltage is responsive to output voltage 115. Accordingly, by subtracting effective voltage 511 from reference voltage 512, any error in effective voltage may be identified and amplified as analog voltage 514.

Analog voltage 514 may be provided to a minus port of comparator 507. A ramp voltage signal 513, such as a triangular or "sawtooth" waveform, from oscillator 506 may be provided to a plus port of comparator 507. Comparator 507 is configured to provide a digital signal output, namely a reset voltage 515. In other words, output of comparator 507 is strings of logic 1s and 0s. Accordingly, it should be understood that by subtracting analog voltage 514 from ramp voltage 513, amplitude of such ramp voltage 513 is shifted, namely shifted down for analog voltage 514 being positive and up for analog voltage 514 being negative. Shifting amplitude of ramp voltage 513 effectively changes the position of zero crossings of ramp voltage 513. Changing position of zero crossings effectively changes duty cycle of ramp voltage 513 as represented by the length of strings of logic 1s and 0s output as reset voltage 515.

Amplifier 504 may be an operational amplifier or a conductance amplifier with a compensation network for enhanced system stability. Comparator 507 may be PWM comparator; in other words, output reset voltage 515 may be a form of PWM. As a PWM comparator, comparator 507 may be a high-gain comparator which is to compare an analog voltage which may vary with a fixed ramp signal, namely ramp voltage 513. Thus, effectively where output of comparator 507 changes from a logic 1 state to a logic 0 state may be used to put flip-flop 508, which in this exemplary embodiment is a reset-set ("RS") latch or flip-flop, into a reset state, where a reset port ("R") of RS latch 508 is falling edge triggered. In this exemplary embodiment, output of comparator 507 is provided to a reset port R of RS latch 508. This reset state is relieved responsive to reset voltage 515 transitioning from a logic 0 to a logic 1.

A clock pulse signal 516 may be provided to a set port ("S") of RS latch 508. In this exemplary embodiment, a set port of RS latch 508 is rising edge triggered.

Clock pulse signal 516 may be provided from oscillator 506. Clock pulse signal 516 may be generated by oscillator 506 to have a relatively narrow pulse every T seconds to set RS latch 508. It should be understood that ramp voltage 513 may be at least approximately synchronous with clock pulse signal 516 by having both ramp voltage 513 and clock pulse signal 516 generated by oscillator 506. By having synchronized periodic signals, namely ramp voltage 513 and clock pulse signal 516, a comparison with analog voltage 514, namely the effective error, if any, in output voltage 115, may be made.

Thus, for example, a PWM comparator 507 may compare an analog voltage 514 with a fixed ramp voltage 513 to determine each instant of resetting RS latch 508, and thus determining a pulse width of reset digital voltage 515 as represented by a sting of logic 1s output from comparator 507 in this exemplary embodiment. RS latch 508 is reset responsive to falling edges of reset voltage 515, and optionally an output buffer 509 may be coupled to Q and Q-bar output ports of RS latch 508 to buffer phase signals 201 and 202 respectively sourced from such output ports. Negative feedback may be used to drive pulse width to a correct value to provide a predetermined output voltage 115.

Figure 6:
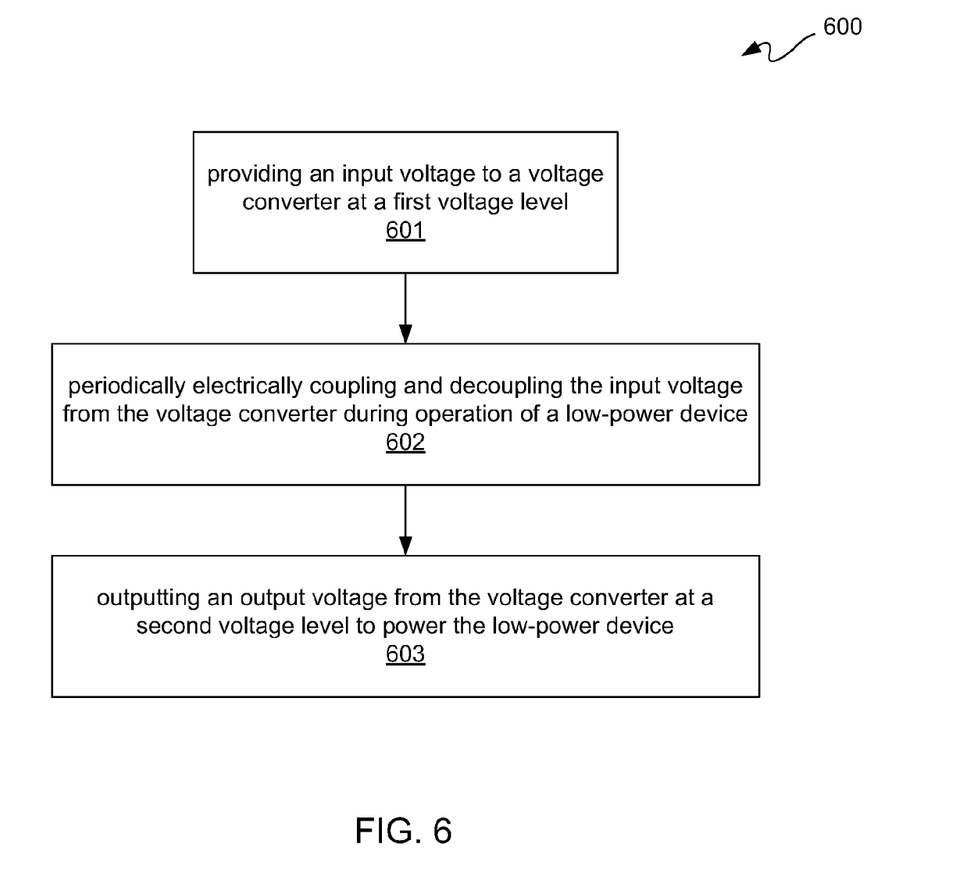
FIG. 6 is a flow diagram depicting an exemplary embodiment of a powering flow for powering a low-power device using a power supply designed for a high-power device.

FIG. 6 is a flow diagram depicting an exemplary embodiment of a powering flow 600 for powering a low-power device using a power supply designed for a high-power device as described above. At 601, an input voltage is provided to a voltage converter at a first voltage level. At 602, the input voltage is periodically electrically coupled to and decoupled from the voltage converter during operation of the low-power device. The operation of the low-power device is not interrupted by such decoupling due to capacitively stored charge being discharged, where such discharging provides a regulated voltage for continued operation of the low-power device. It should be understood that the term "periodically" as used herein is meant to include a frequency of operation where duty cycle of such coupling and decoupling may be constant or vary as described herein. Thus, the term "periodically" should not be construed to be limited to a fixed duty cycle even though during operation such duty cycle may be constant for stretches of time.

At 603, an output voltage is output from the voltage converter at a second voltage level to power the low-power device. Such output voltage is provided during both the electrical coupling and decoupling of the input voltage to and from the voltage converter, and such second voltage level is substantially less than such first voltage level.

In an embodiment, the second voltage level is for the low-power device being a MOS-based device, and the first voltage level is for the high-power device being a bi-polar-based device. It should be understood that a MOS-based intermediary signal conditioning device consumes significantly less power than a bi-polar-based intermediary signal conditioning device at comparable levels of performance. Furthermore, it should be understood that such voltage converter consumes less power when electrically decoupled from the input voltage than when electrically coupled to the input voltage. Accordingly, the output voltage may be continuously provided without continuously drawing current associated with the providing of the input voltage.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method for powering a low-power device using a power supply designed for a high-power device, comprising:
    providing a voltage converter for use of an input voltage at a first voltage level;
    periodically electrically coupling and decoupling the input voltage from the voltage converter during operation of the low-power device;
    outputting an output voltage from the voltage converter at a second voltage level to power the low-power device;
    wherein the output voltage is provided during both the input voltage being electrically coupled to and decoupled from the voltage converter;
    wherein the second voltage level is substantially less than the first voltage level;
    wherein the low-power device is an intermediary signal conditioning device;
    wherein the first voltage level is in a first range of 3.3 to 5.0 volts;
    wherein the second voltage level is in a second range of 1.2 to 1.5 volts;
    wherein the voltage converter is a DC-to-DC voltage converter;
    wherein the second voltage level is for the low-power device being a MOS-based intermediary signal conditioning device for high-speed serial communication; and
    wherein the first voltage level is for the high-power device being a bi-polar-based intermediary signal conditioning device.

2. The method according to claim 1, wherein the MOS-based intermediary signal conditioning device consumes significantly less power than the bi-polar-based intermediary signal conditioning device at comparable levels of performance.

3. The method according to claim 1, wherein the voltage converter consumes less power when electrically decoupled from the input voltage than when electrically coupled to the input voltage.

4. The method according to claim 3, wherein the output voltage is continuously provided without continuously drawing current associated with the providing of the input voltage.

5. A voltage converter, comprising:
    a voltage input port for receiving an input voltage;
    a bimodal switch coupled to the voltage input port;
    a voltage output port coupled to the bimodal switch for sourcing an output voltage;
    a ground port coupled to the bimodal switch;
    a phase signal generator coupled to the voltage output port for feedback of the output voltage and configured to generate a first phase signal and a second phase signal;
    wherein the first phase signal and the second phase signal are at least approximately 180 degrees out-of-phase with respect to one another;
    the bimodal switch coupled to receive the first phase signal and the second phase signal; and
    the bimodal switch configured to electrically couple and decouple the bimodal switch to and from the input voltage port responsive to the first phase signal and the second phase signal.

6. The voltage converter according to claim 5, wherein the voltage converter does not include any inductor and does not use an external inductor.

7. The voltage converter according to claim 5, wherein the bimodal switch includes:
    a first switch and a second switch each coupled to receive the first phase signal; and
    a third switch and a fourth switch each coupled to receive the second phase signal.

8. The voltage converter according to claim 7, wherein the first switch, the second switch, the third switch, and the fourth switch each include at least one transistor.

9. The voltage converter according to claim 7, wherein the phase signal generator includes:
    a voltage divider coupled between the voltage output port and the ground port and configured to provide a divided voltage of the output voltage;
    an amplifier coupled to receive the divided voltage and a reference voltage as inputs and configured to output an analog voltage responsive to a difference between the divided voltage and the reference voltage multiplied by a gain of the amplifier;
    a comparator coupled to receive the analog voltage and a first oscillator signal as inputs and configured to output a digital signal responsive to a difference between the analog voltage and the first oscillator signal; and
    a flip-flop coupled to receive the digital signal and a second oscillator signal and configured to provide the first phase signal and the second phase signal.

10. The voltage converter according to claim 9, wherein:
    the first oscillator signal is of a triangle waveform;
    the analog voltage is subtracted from the first oscillator signal to change position of zero crossings of the triangle waveform altering duty cycle thereof;
    the digital signal includes strings of ones and zeros responsive to the duty cycle as altered to provide pulse width modulation;
    the second oscillator signal is of a clock pulse waveform;
    the first oscillator signal and the second oscillator signal are provided from an oscillator; and
    the reference voltage is provided from a voltage generator.

11. The voltage converter according to claim 10, wherein the voltage generator and the oscillator are external to a chip in which the voltage converter is located.

12. A system for voltage conversion, comprising:
    the voltage converter of claim 7;
    a first capacitor and a second capacitor external to a chip in which the voltage converter is located;
    the first capacitor coupled between a first common node and a second common node;
    the first common node locate between and common to both the first switch and the third switch;
    the second common node located between and common to both the second switch and the fourth switch; and the second capacitor coupled between the voltage output port and the ground port.

13. The system according to claim 12, wherein in a first mode of the bimodal switch:
the first capacitor and the second capacitor are charged by the input voltage; and
the output voltage is provided from the input voltage through a capacitor divider formed of the first capacitor and the second capacitor.

14. The system according to claim 13, wherein in a second mode of the bimodal switch:
the first capacitor and the second capacitor are discharged to provide the output voltage with the first capacitor leaking charge to the second capacitor; and
the second capacitor discharging to provide the output voltage.

15. The system according to claim 12, further comprising:
an intermediary signal conditioning device coupled to receive the output voltage from the voltage converter;
wherein the voltage converter is a DC-to-DC voltage converter; and
wherein the voltage converter and the intermediary signal conditioning device are located in the chip.

16. The system according to claim 15, wherein the first capacitor, the second capacitor, and the chip are all internal components of a multi-chip module.

17. The system according to claim 12, further comprising:
an intermediary signal conditioning device coupled to receive the output voltage from the voltage converter;
wherein the voltage converter is a DC-to-DC voltage converter; and
wherein the voltage converter is located in the chip and the intermediary signal conditioning device is located in another chip.

18. The system according to claim 17, wherein both the voltage converter and the intermediary signal conditioning device are internal components of a multi-chip module.

19. The system according to claim 18, wherein the first capacitor and the second capacitor are internal components of the multi-chip module.

20. A method for powering a low-power device using a power supply designed for a high-power device, comprising:
providing a voltage converter for use of an input voltage at a first voltage level;
periodically electrically coupling and decoupling the input voltage from the voltage converter during operation of the low-power device;
outputting an output voltage from the voltage converter at a second voltage level to power the low-power device;
wherein the output voltage is provided during both the input voltage being electrically coupled to and decoupled from the voltage converter;
wherein the second voltage level is substantially less than the first voltage level;
wherein the low-power device is an intermediary signal conditioning device;
wherein the first voltage level is 2 to 3 times larger than the second voltage level;
wherein the voltage converter is a DC-to-DC voltage converter;
wherein the second voltage level is for the low-power device being a MOS-based intermediary signal conditioning device for high-speed serial communication; and
wherein the first voltage level is for the high-power device being a bi-polar-based intermediary signal conditioning device.

21. The method according claim 20, wherein the MOS-based intermediary signal conditioning device consumes significantly less power than the bi-polar-based intermediary signal conditioning device at comparable levels of performance.

22. The method according to claim 20, wherein the voltage converter consumes less power when electrically decoupled from the input voltage than when electrically coupled to the input voltage.

23. The method according to claim 22, wherein the output voltage is continuously provided without continuously drawing current associated with the providing of the input voltage.

* * * * *